S. C. Jennings,
Bed Bottom.

N° 67,554. Patented Aug. 6, 1867.

Witnesses:
Theo Fusche
J. A. Service

Inventor:
Samuel C. Jennings
Per Munn & Co
Attorneys

UNITED STATES PATENT OFFICE.

SAMUEL C. JENNINGS, OF WAUTOMA, WISCONSIN.

IMPROVED BED-BOTTOM.

Specification forming part of Letters Patent No. 67,554, dated August 6, 1867.

*To all whom it may concern:*

Be it known that I, SAMUEL C. JENNINGS, of Wautoma, in the county of Waushara and State of Wisconsin, have invented a new and useful Improvement in Spring Bed-Bottoms; and I do hereby declare that the following is a full, clear, and exact description thereof, which will enable others skilled in the art to make and use the same, reference being had to the accompanying drawings, forming part of this specification, in which—

Figure 1:
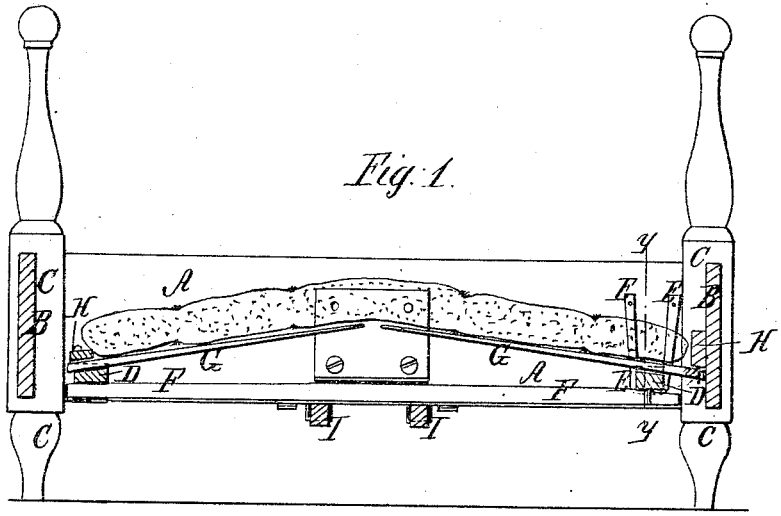
Figure 2:
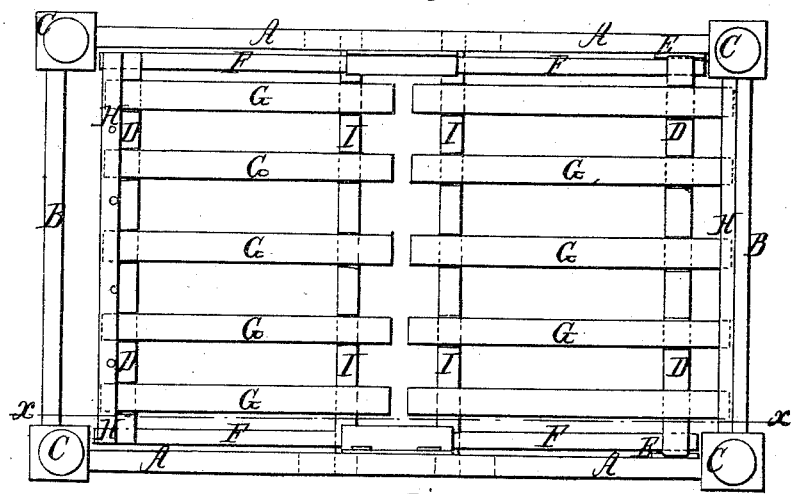
Figure 3:
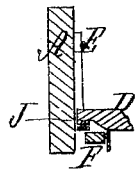

Figure 1 is a vertical longitudinal section of a bedstead to which my improved bed-bottom has been attached. Fig. 2 is a top or plan view of the same; and Fig. 3 is a detail sectional view taken through the line $y\ y$, Fig. 1.

Similar letters of reference indicate like parts.

My invention has for its object to furnish a simple, cheap, and efficient spring bed-bottom; and it consists in the combination of sets of spring slats or levers and their bearing-bars with the frame of the bedstead, as hereinafter more fully described.

A are the side rails, B are the end rails, and C are the posts, of the bedstead, about the construction of which parts there is nothing new.

D are the bearing-bars, which extend across the bedstead and are placed near its end rails, B, as shown in the drawings. The ends of the bearing-bars D rest upon some suitable supports, as E, secured to the side rails of the bedstead.

If desired, the ends of the bearers D may rest upon the ends of long spring-bars F, supported at their middle points by the side rails, A.

The upper sides of the bearers D are notched to receive the spring slats or levers G and keep them in their proper relative positions. The slats or spring-levers G are about half the length of the bedstead, are of nearly uniform breadth, and decrease slightly in thickness from the ends of the bedstead toward its center, as shown in Fig. 1. One end of the slats G rests under cleats H, attached to the end rails of the bedstead or to the upper side of the bearers D. In the latter case the said cleats H should be attached so far back upon the said bearers D, and the notches in which the levers or slats G rest should be so formed, that the spring-levers G may have a sufficient purchase to sustain the weight of those lying upon the bed.

I are slats attached to the lower parts of the middle of the side rails, A, of the bedstead, so as to receive and sustain the free ends of the spring slats or levers G, should one or more of the free ends of the said levers be forced too far down by placing an undue weight upon them.

If desired, the cleats H may be dispensed with and the ends of the slats G be placed beneath the lower edges of the end rails, B, of the bedstead.

The spring-levers G may be kept from working out of place by pins inserted in the lower sides of the cleats H and entering holes in the ends of the slats G, as shown in Fig. 1.

If desired, rubber blocks or springs J may be interposed between the ends of the bearers D and the supports E or F, upon which they rest, as shown in Fig. 3.

The rubber blocks or springs J tend to make the bed-bottom more elastic, and at the same time prevent any noise from the said bearers working upon their supports while the bed-bottom is being used.

I claim as new and desire to secure by Letters Patent—

The spring bed-bottom constructed as described, consisting of two sets of springs, G, their inner ends free and their outer ends secured between the bars H D, the latter resting either upon the side springs, F, or provided with the elastic blocks J and resting upon the loops E secured to the side rails, A, all arranged to operate as herein set forth, for the purpose specified.

SAMUEL C. JENNINGS.

Witnesses:
JOSEPH REW,
W. H. BERRAY.